United States Patent
Schell et al.

(10) Patent No.: US 7,940,895 B2
(45) Date of Patent: *May 10, 2011

(54) METHODS AND COMPUTER PROGRAM PRODUCTS FOR TRACKING MODIFICATIONS IN PHYSICAL PLANT DURING MAINTENANCE OF A COMMUNICATION NETWORK

(75) Inventors: H. Mike Schell, Brandon, MS (US);
Dustin Majure, Philadelphia, MS (US);
William W. Bolian, Jackson, MS (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1006 days.

This patent is subject to a terminal disclaimer.

(21) Appl. No.: 11/801,827

(22) Filed: May 11, 2007

(65) Prior Publication Data
US 2007/0211865 A1    Sep. 13, 2007

Related U.S. Application Data

(63) Continuation of application No. 10/412,500, filed on Apr. 11, 2003, now Pat. No. 7,263,175.

(51) Int. Cl.
*H04M 1/24* (2006.01)
*H04M 3/08* (2006.01)
*H04M 3/22* (2006.01)

(52) U.S. Cl. .......... 379/9.04; 379/9.02; 379/15.03; 379/32.01

(58) Field of Classification Search .......... 379/1.01, 379/9, 9.02–9.04, 14.01, 15.01–15.03, 15.05, 379/29.09, 32.01; 714/100, 48
See application file for complete search history.

(56) References Cited

U.S. PATENT DOCUMENTS

| | | |
|---|---|---|
| 5,764,726 A | 6/1998 | Selig et al. |
| 5,790,634 A | 8/1998 | Kinser et al. |
| 6,032,184 A | 2/2000 | Cogger et al. |
| 6,445,774 B1 | 9/2002 | Kidder et al. |
| 6,516,055 B1 | 2/2003 | Bedeski et al. |
| 6,778,638 B1 | 8/2004 | Jean et al. |
| 6,870,900 B1 | 3/2005 | Beamon |
| 7,263,175 B2 * | 8/2007 | Schell et al. .......... 379/9.04 |

* cited by examiner

*Primary Examiner* — Quoc D Tran
(74) *Attorney, Agent, or Firm* — Myers Bigel Sibley & Sajovec, P.A.

(57) ABSTRACT

Modifications made to physical plant in maintaining a communication network may be tracked by receiving notices corresponding to incidences in which physical plant is modified in performing maintenance tasks on a communication network and associated time information, receiving information specifying a total number of maintenance tasks performed on the communication network during a defined time interval, and storing information associated with the maintenance tasks in which physical plant is modified and the total number of maintenance tasks performed on the communication network in a searchable database.

20 Claims, 14 Drawing Sheets

Search

The BreakCT Database contains 41477 records.

I would like to view by:  Network VP [All]
                          During Month [August 2002]

View:

⦿ BreakCT's   Taper Code: [        ]           Serving Terminal: [        ]

Employee Code: [All]             Sort Order: [Wire Center]

Show These Types:   ☑ Svc. Order Related      Show These Dates:  [Items for this Timeframe]
                                  ☑ Maintenance
                                  ☑ Other Include Reviewed Items  ☐        Show Only BCT/LST  ☐

○ Statistics       Maximum Threshold: [  ]%

○ Summary

[Search]

*FIG. 5*

Search

The BreakCT Database contains 41568 records.

I would like to view by:  Network VP  Christian, Rudy
                          District     All
                          During Month August 2002

FIG. 6

The BreakCT Database contains 41570 records.

I would like to view by:  Network VP   Christian, Rudy
                          District     ATL - NWEST
                          Turf         MTTA
                          Wire Center  770475
                          During Month July 2002

SurveyPage

| HOME | View Image |
| --- | --- |
| AL/MS Centers<br>SPOT<br>Inventory System<br>Network News<br>CallStudy | 🔍 view  ⟳ update<br><br>747/688 MR 02/7/23 16:53:02 214153 *16K3$<br><br>Tue Jul 23 16:53:02 2002<br><br>page 1<br>WC: 278257    EMP: adp<br>LOOP INVENTORY           chg loop<br>BCT NOTICE<br>-----------------------------------------------<br><br>A chg loop  HAS RESULTED IN "BREAK-CT"<br><br>-----------------------------------------------<br><br>PREVIOUS CT LOOP DATA<br><br>addr:no AHN-9  st TULES LANDING RD  com WESTVIEW  state KY<br>serv tea: P 21 TULES LANDING DR  tpr 123801<br>ct est date: 020714<br>f 1  ca PG4  pr 306<br>tea P 51 HIGHWAY 259  tpr 127001<br>f 2  ca 120  pr 532<br>tea P 21 TULES LANDING DR  tpr 123801<br><br>REMAINING LOOP DATA<br><br>serv tea: P 21 TULES LANDING DR  tpr 123801<br>lp stat: CF  csw: ex Y  tra Y<br>f 1  ca PG4  pr 306<br>tea P 51 HIGHWAY 259  tpr 127001<br>f 2  ca 120  pr 532<br>tea P 21 TULES LANDING DR  tpr 123801<br><br>NOTE: ADDITIONAL LOOPS EXIST AT THIS ADDRESS |

FIG. 10

Update Entry for 4256 HICKS RD
Enter your comments for this BreakCT here.
Hello, Marie
Not Marie? Click here.
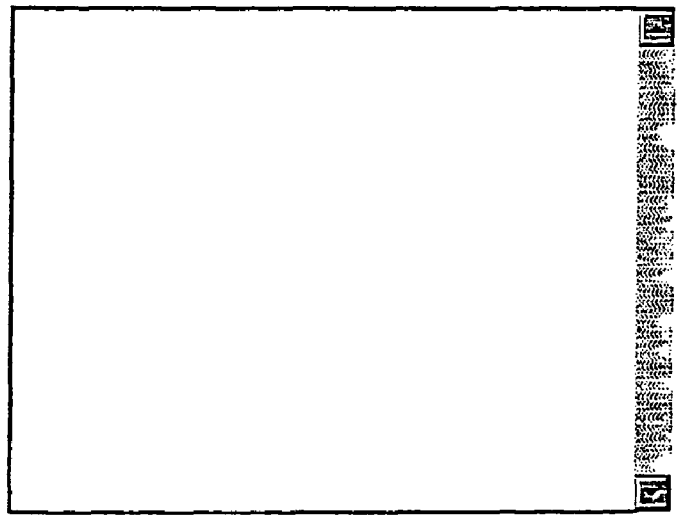
☐ This BreakCT has been reviewed and the issue has been resolved.
Close this window
*FIG. 12*

Query Results
Statistics Summary:
Scott A. Mulcahy: WEST-W FLA: PENSA: PNSCFLPB: August 2002

Total Re-Install Orders: 80

Re-Install Orders that didn't Require Outside Dispatch: 78

Re-Install Orders that did Require Outside Dispatch: 2

Percentage Requiring Outside Dispatch: 2%

```
            RESIDENCE SERVICE ORDER FLOW THROUGH SUMMARY
                           NETWORK HIERARCHY

DOMAIN    = N. Florida                  SOFTER VERS. = 3.8
DIVISION  = WEST                        Report Month = August
DISTRICT  = W FLA                       Run Date     = 08-14-02
WIRE CENTER = PNSCFLPB ISS   ASGN  FRM   FAC   TRN   COM   NO    TOTAL
ORDER ACTIVITY     # ORDERS   % FT  % FT  % FT  % FT  % FT  % FT  TRBL  % FT
..................  ........  ....  ....  ....  ....  ....  ....  ....  .....
     NEW INSTALL         9    88.9  77.8  77.8   0.0 100.0  77.8  77.8   0.0
     RE-INSTALL         80    92.5  92.5  88.8  97.5  96.2 100.0  97.5  67.5
     ADDITIONAL LINE     8    87.5 100.0 100.0  37.5 100.0 100.0  87.5  25.0

INWARD ORDERS           97    91.8  91.8  88.7  83.5  96.9  97.9  94.8  57.7

DENIAL/RESTORAL         28   100.0 100.0 100.0 100.0 100.0 100.0  92.9  92.9

FEATURES ONLY           88   100.0 100.0 100.0 100.0  96.6 100.0  95.5  92.0

OTHER CHANGE ORDERS     61    95.1 100.0  98.4  98.4  98.4 100.0  98.4  98.2
```

Month History   Required Dispatch

August    28 of 308 (9%)    ■■
July      56 of 792 (7%)    ■■

Top Ten Taper Codes With BreakCT's   Top Ten Serving Terminals
                                           With BreakCT's Taper Code    Breaks
                                     Serving Terminal           Breaks
4109 (850871)    2
2110 (850871)    1                   F 1551 HORNE AV               1
                                     F 1305 CLOVER RD              1
                                     F 1035 S BERTHE AV LOT 1      1

*FIG. 13*

ResultsPage

| HOME | Query Results |
|---|---|
| AL/MS Centers<br>SPOT<br>Inventory System<br>Network News<br>CallStudy | Statistics Summary:<br>All Network Vice-Presidents: August 2002<br><br>Total Re-Install Orders:   182225<br><br>Re-Install Orders that didn't Require Outside Dispatch: 163949<br><br>Re-Install Orders that did Require Outside Dispatch:  18276<br><br>Percentage Requiring Outside Dispatch:   10% |

| Individual Views | Required Dispatch | | % of Current Region | |
|---|---|---|---|---|
| Larry E. Shumpert | 3870 of 45925 (8%) | ■ | 3870 of 18276 (21%) | ■ |
| Rudy Christian | 4224 of 45821 (9%) | ■ | 4224 of 18276 (23%) | ■ |
| D. G. (Darrell) Cooper | 5367 of 46141 (12%) | ■ | 5367 of 18276 (29%) | ■ |
| Scott A. Mulcahy | 5648 of 52040 (11%) | ■ | 5648 of 18276 (31%) | ■ |

Month History   Required Dispatch

| August | 19109 of 189927 (10%) | ■ |
|---|---|---|
| July | 39849 of 359666 (11%) | ■ |
| June | 3782 of 18215 (21%) | ■ |

| Top Ten Taper Codes With BreakCT's | | Top Ten Serving Terminals With BreakCT's | |
|---|---|---|---|
| Taper Code | Breaks | Serving Terminal | Breaks |
| 2299 (901372) | 86 | S 200 UNIVERSITY VILLAGE DR | 36 |
| 7245 (770962) | 49 | R 101 PONDER CT | 13 |
| 3110 (803115) | 39 | S 1114 S COLLEGE ST BLDG 9 APT 104 | 13 |
| 4114 (305556) | 32 | SAP I 8941.1.1 LAKE DR | 13 |

*FIG. 14*

Query Results

Statistics Summary:
Scott A. Mulcahy: All Districts: August 2002

Total Re-Install Orders: 52040

Re-Install Orders that didn't Require Outside Dispatch: 46392

Re-Install Orders that did Require Outside Dispatch: 5648

Percentage Requiring Outside Dispatch: 11%

| Individual Views | Required Dispatch | | % of Current Region | |
|---|---|---|---|---|
| WEST - W FLA | 329 of 3599 (9%) | | 329 of 5648 (6%) | |
| ORL - ORL | 384 of 5493 (7%) | | 384 of 5648 (7%) | |
| INDRV - INDRV | 448 of 4840 (9%) | | 448 of 5648 (8%) | |
| NCFLA - GNSVL | 512 of 7232 (7%) | | 512 of 5648 (9%) | |
| NBRWD - NBRWD | 583 of 5383 (11%) | | 583 of 5648 (10%) | |
| NORTH - JCVL | 600 of 4826 (12%) | | 600 of 5648 (11%) | |
| SBRWD - SBRWD | 620 of 4537 (14%) | | 620 of 5648 (11%) | |

*FIG. 15*

Summary Report
All Network Vice-Presidents

| Softer | | | BCT Activity | | | | | | Analysis | | |
|---|---|---|---|---|---|---|---|---|---|---|---|
| Division | %FT | Total Reinstall Dispatches | Aug 2002 (Now) | Jul 2002 | Jun 2002 | % MTC | % SO | % ATM | BCT Delta From Prev. 3 Months | Inward Mvmt. From Prev. 3 Months | Indicator |
| D. G. (Darrell) Cooper | 86% | 20039 | 3772 | 7830 | 788 | 8% | 74% | 18% | 0% | 0% | Expected |
| Scott A. Mulcahy | 89% | 17163 | 4007 | 9572 | 485 | 13% | 49% | 39% | 0% | 0% | Expected |
| Rudy Christian | 90% | 13268 | 2802 | 6109 | 1119 | 11% | 52% | 37% | 0% | 0% | Expected |
| Larry E. Shumpert | 91% | 12270 | 2719 | 4635 | 1109 | 10% | 54% | 36% | 0% | 0% | Expected |

Legend

| | |
|---|---|
| %FT: | Percent of Re-install orders in the region that flowed through without requiring outside dispatch. |
| Total Reinstall Dispatches: | The number of field dispatches made by this division over the past year. |
| (Month) (Year): | The number of BreakCT's that occurred in this month. |
| % MTC: | The percentage of BreakCT's over the displayed three months that are classified as BreakCT's broken at the request of a maintenance technician so that the F1 and/or F2 can be used for repairing another line. |
| % SO: | The percentage of BreakCT's over the displayed three months that are driven by service orders. |
| % ATM: | The percentage of BreakCT's over the displayed three months that are broken by automated systems such as ADEPT and the AFIG doing record correction. |
| BCT Delta From Prev. 3 Months: | A rolling three month average showing the change in BreakCT activity from the last three month view to the current three month view. |
| Inward Mvmt From Prev. 3 Months: | A rolling three month average showing the change in Inward Order activity from the last three month view to the current three month view. |
| Indicator | Logic indicating performance trends within the division due to BreakCT and Inward Movement activity changes, assuming a linear relationship between the two. It can determined manually by viewing the chart here. |

FIG. 16

METHODS AND COMPUTER PROGRAM PRODUCTS FOR TRACKING MODIFICATIONS IN PHYSICAL PLANT DURING MAINTENANCE OF A COMMUNICATION NETWORK

RELATED APPLICATION

This application is a continuation of U.S. patent application Ser. No. 10/412,500, filed Apr. 11, 2003 now U.S. Pat. No. 7,263,175, the disclosure of which is hereby incorporated herein by reference.

BACKGROUND OF THE INVENTION

The present invention relates to communication networks, and, more particularly, to maintaining the physical plant in the public switched telephone network (PSTN).

In the PSTN, a network services provider, such as a Local Exchange Carrier (LEC), Bell Operating Company (BOC), and/or Regional Bell Operating Company (RBOC) typically dedicates central office equipment and loop facilities, which may be referred to as physical plant, to a given address. The combination of dedicated office equipment and loop facilities may be referred to as a cut-through (CT). When new service is requested at an address, a technician may be dispatched to the address to establish the new service. Frequently, the technician breaks the existing loop facilities running to another address and sets up new loop facilities to this address to establish the new service. Oftentimes, breaking the existing loop facilities is unnecessary as the existing facilities could have been used if they had been provisioned electronically and/or if they had been repaired or maintained in some way. Because it is often easier to break the existing loop facilities and set up new loop facilities than it is to repair or maintain the existing loop facilities, technicians frequently prefer to set up new service or fix a service problem by breaking the existing loop facilities and running new loop facilities to the address. Moreover, because technicians are often given quotas for the number of service orders to be completed, there is even greater incentive for technicians to favor breaking existing loop facilities and replacing them with new loop facilities over repairing and/or maintaining the existing loop facilities.

SUMMARY OF THE INVENTION

According to some embodiments of the present invention, modifications made to physical plant in maintaining a communication network may be tracked by receiving notices corresponding to incidences in which physical plant is modified in performing maintenance tasks on a communication network and associated time information, receiving information specifying a total number of maintenance tasks performed on the communication network during a defined time interval, and storing information associated with the maintenance tasks in which physical plant is modified and the total number of maintenance tasks performed on the communication network in a searchable database.

In other embodiments, wherein storing information includes parsing email notices corresponding to the information specifying the total number of maintenance tasks performed on the communication network.

In still other embodiments, storing information includes parsing print files corresponding to the notices corresponding to incidences in which physical plant is modified.

In still other embodiments, storing information includes associating a respective one of the maintenance tasks in which physical plant is modified with a maintenance category based on information received from a service technician performing the maintenance task, associating a respective one of the maintenance tasks in which physical plant is modified with a service order category based on information contained in the notice received for the respective one of the maintenance tasks authorizing the modification, and associating a respective one of the maintenance tasks in which physical plant is modified with an other category based on information contained in the notice received for the respective one of the maintenance tasks authorizing the modification due to at least one of lack of use of the physical plant and redeployment of the physical plant.

In still other embodiments, storing information includes organizing the information in the searchable database based on geography. The method further includes receiving user input comprising a query of the searchable database based on geography, and displaying the information organized geographically responsive to the user input.

In still other embodiments, organizing the information based on geography includes organizing the information in the searchable database based on state, district, turf, and wire center.

In still other embodiments, the method further includes receiving user input comprising a query of the searchable database based on at least one of the state, the district, the turf, and/or the wire center, displaying the information organized based on at least one of the state, the district, the turf, and/or the wire center responsive to the user input, organizing the information based on employee responsible for a district, receiving user input comprising a query of the searchable database based on the employee responsible for a district, and displaying the information organized based on the employee responsible for a district responsive to the user input.

In still other embodiments, the method further includes receiving user input comprising a request to update the information associated with a respective one of the maintenance tasks in which physical plant is modified, and updating the information stored in the searchable database for the respective one of the maintenance tasks in which physical plant is modified responsive to the user input.

In still other embodiments, storing information includes storing information in which the maintenance tasks in which physical plant is modified is represented as a percentage of the total number of maintenance tasks performed on the communication network in the searchable database.

In still other embodiments, the method further includes receiving user input comprising a query of the information stored in the searchable database, and displaying the queried for information responsive to the user input.

Although described primarily above with respect to method aspects of tracking modifications in physical plant that occur in maintaining a communication network, it will be understood that the present invention may also be embodied as computer program products.

BRIEF DESCRIPTION OF THE DRAWINGS

Other features of the present invention will be more readily understood from the following detailed description of specific embodiments thereof when read in conjunction with the accompanying drawings, in which:

FIGS. 5-16 illustrate exemplary user queries and/or Web page displays provided by a Web server module in response to searchable database queries/input submitted by a user in accordance with some embodiments of the present invention.

DETAILED DESCRIPTION OF PREFERRED EMBODIMENTS

Figure 1:
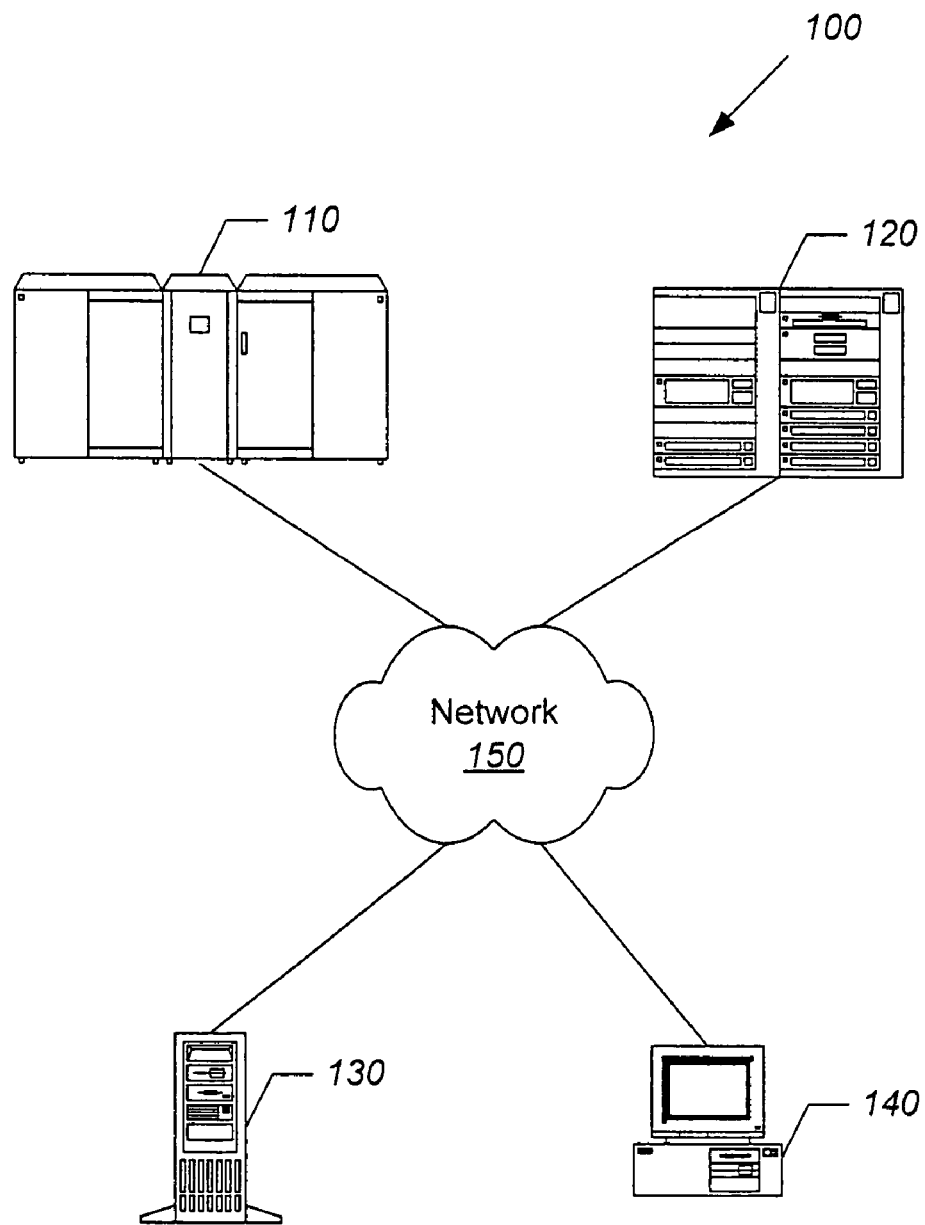
FIG. 1 is a block diagram that illustrates a communication network for tracking breaks in physical plant that occur in maintaining a public switched telephone network (PSTN) in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

FIG. 1 is a block diagram that illustrates a communication network 100 for tracking breaks in physical plant that occur in maintaining a public switched telephone network (PSTN), in accordance with some embodiments of the present invention. As shown in FIG. 1, the communication network 100 comprises a data processing system 110 that is configured to deliver notices corresponding to incidences in which physical plant is broken in performing maintenance tasks on the PSTN during a defined time interval. These notices may be referred to as break cut-through (CT) notices. The communication network 100 further comprises a data processing system 120 that is configured to deliver notices corresponding to information specifying and associated with a total number of maintenance tasks performed on the PSTN during a defined time interval. The communication network 100 further comprises a data processing system 130 that receives the notices from both of the data processing systems 110 and 120 and stores the received information in a searchable database to facilitate tracking of breaks in physical plant that occur in maintaining the PSTN. Moreover, the searchable database may be accessed via queries submitted from users via, for example, a data processing system 140. The data processing system 140 may be a personal computer, workstation, laptop computer, personal digital assistant (PDA), or the like. The data processing systems 110, 120, 130, and 140 communicate via a network 150, which may comprise, for example, the Internet, a wide area network, a local area network, and/or combinations of such networks.

Although FIG. 1 illustrates an exemplary communication network for tracking breaks in physical plant that occur in maintaining a PSTN in accordance with some embodiments of the present invention, it will be understood that the present invention is not limited to such a configuration but is intended to encompass any configuration capable of carrying out operations described herein.

Figure 2:
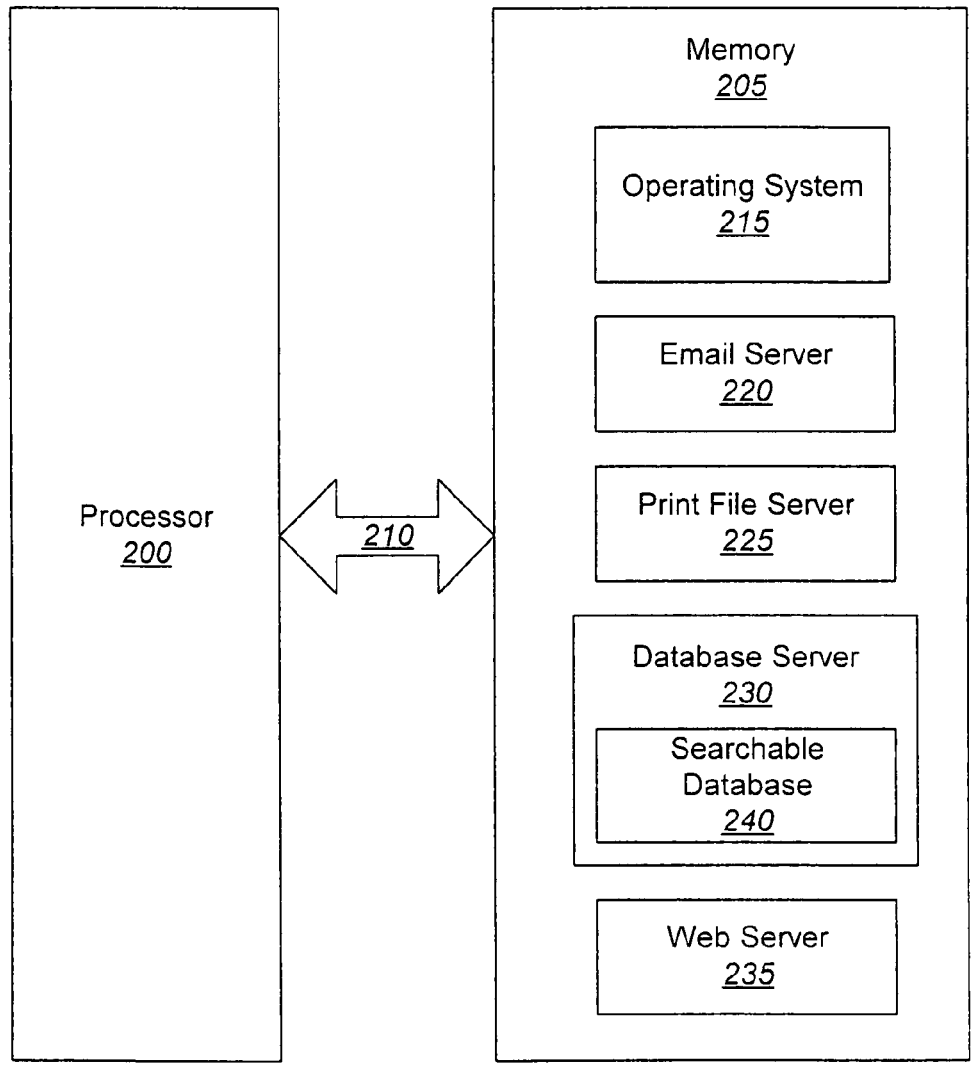
FIG. 2 is a block diagram that illustrates a software architecture for use in a data processing system for tracking breaks in physical plant that occur in maintaining a public switched telephone network (PSTN) in accordance with some embodiments of the present invention.

FIG. 2 illustrates a processor 200 and memory 205 that may be used in embodiments of data processing systems, such as the data processing system 130 of FIG. 1, for tracking breaks in physical plant that occur in maintaining a PSTN in accordance with some embodiments of the present invention. The processor 200 communicates with the memory 205 via an address/data bus 210. The processor 200 may be, for example, a commercially available or custom microprocessor. The memory 205 is representative of the one or more memory devices containing the software and data used to facilitate packet classification and/or association with services in accordance with embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to five or more categories of software and/or data: an operating system 215, an email server module 220, a print file server module 225, a database server module 230, and a Web server module 235. The operating system 215 generally controls the operation of the data processing system. In particular, the operating system 215 may manage the data processing system's software and/or hardware resources and may coordinate execution of programs by the processor 200.

The email server module 220 may be configured to process notices corresponding to information specifying and associated with a total number of maintenance tasks performed on the PSTN that are received, for example, from the data processing system 120 of FIG. 1. In particular embodiments, the notices sent from the data processing system 120 of FIG. 1 may be in the form of print files. The print file server module 225 may be configured to parse these print file notices to obtain the information contained therein for storage in a searchable database 240.

The print file server module 225 may be configured to process notices corresponding to incidences in which physical plant is broken that are received, for example, from the data processing system 110 of FIG. 1. In particular embodiments, the notices sent from the data processing system 110 of FIG. 1 may be in the form of email notices. The email server module 220 may be configured to parse these email notices to obtain the information contained therein for storage in the searchable database 240.

The database server module 230 may be configured to manage the searchable database 240 in which information associated with the maintenance tasks in which physical plant in the PSTN is broken and information associated with the total number of maintenance tasks performed on the PSTN is stored. The database server 230 may be, for example, a structured query language (SQL) server and the searchable database 240 may be, for example, a SQL database in accordance with some embodiments of the present invention. It will be understood, however, that other database implementations may be used in accordance with other embodiments of the present invention.

The Web server module 235 may be configured to allow users to access the searchable database 240 through a Web browser running on a data processing system, such as, for example, the data processing system 140 of FIG. 1. In accordance with some embodiments of the present invention, the Web server 235 may be embodied using the IIS Web server provided by Microsoft Corporation in which active server pages (ASPs) are used to present data to a user and used to form queries for the searchable database 240. Advantageously, by querying the searchable database 240, a user may be able to track the number of times that physical plant is broken in view of the total number of maintenance tasks being performed. That is, the searchable database 240 may be queried to determine, for example, what percentage of all maintenance tasks being performed in a defined time interval resulted in the physical plant being broken to complete the maintenance task.

Although FIG. 2 illustrates an exemplary software architecture that may be used in data processing systems, such as data processing system 130 of FIG. 1, for tracking breaks in physical plant that occur in maintaining a PSTN in accordance with some embodiments of the present invention, it will be understood that the present invention is not limited to such a configuration but is intended to encompass any configuration capable of carrying out operations described herein.

Computer program code for carrying out operations of data processing systems discussed above with respect to FIG. 2 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for tracking breaks in physical plant that occur in maintaining a PSTN, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
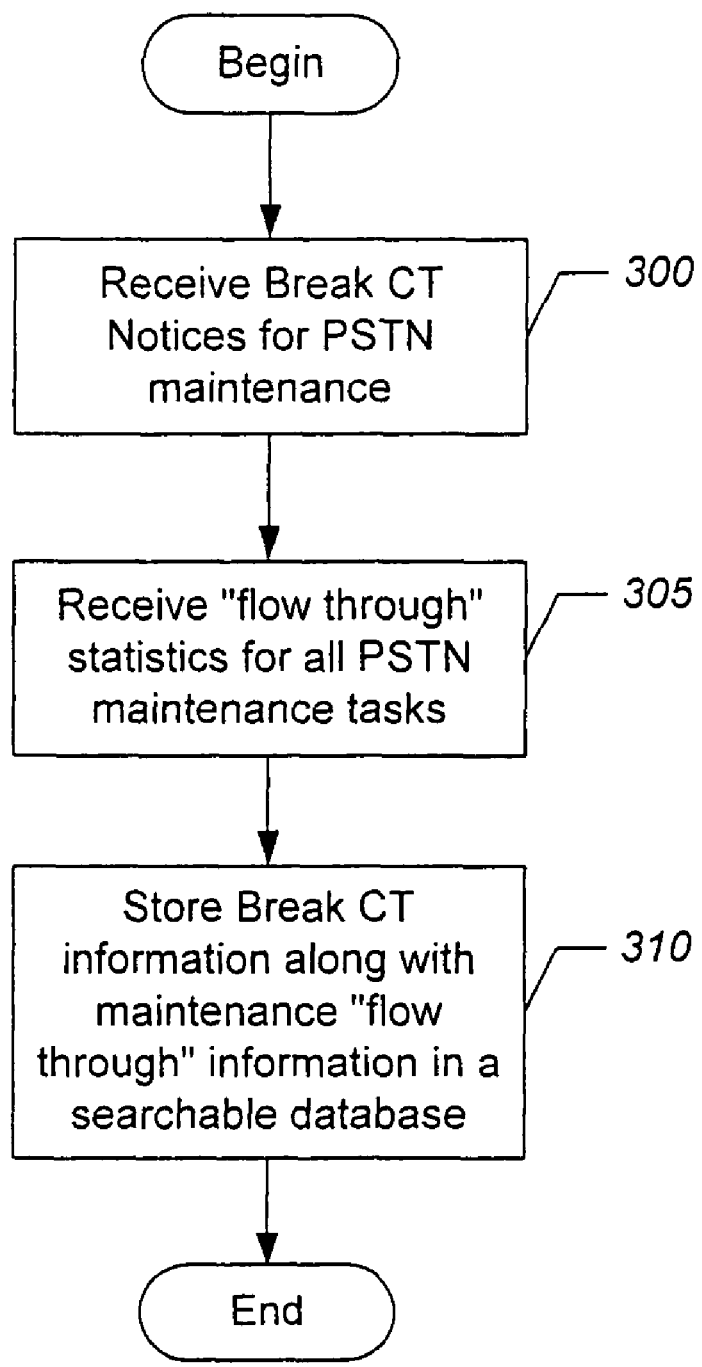
FIGS. 3 and 4 are flowcharts that illustrate operations for tracking breaks in physical plant that occur in maintaining a public switched telephone network (PSTN) in accordance with some embodiments of the present invention.

Referring now to FIG. 3, exemplary operations for tracking breaks in physical plant that occur in maintaining a PSTN, in accordance with some embodiments of the present invention, will now be described. Operations begin at block 300 where the data processing system 130 of FIG. 1, for example, receives break CT notices from the data processing system 110 of FIG. 1 corresponding to incidences in which physical plant is broken in performing maintenance tasks on the PSTN for a defined time interval. As discussed above, the break CT notices may be in the form of print files, which may be parsed using the print file server module 225 of FIG. 2.

At block 305, the data processing system 130 of FIG. 1 receives "flow through" statistics for all PSTN maintenance tasks for the defined time interval from the data processing system 120 of FIG. 1. These "flow through" statistics and/or data may specify a total number of maintenance tasks performed on the PSTN during the defined time interval. That is, the "flow through" data may identify all of the maintenance tasks performed on the PSTN during the defined time interval. As discussed above, the "flow through" information may be in the form of email notices, which may be parsed using the email server module 220 of FIG. 2. At block 310, the information associated with the break CT notices, i.e., the maintenance tasks in which the physical plant in the PSTN is broken and the information associated with all of the maintenance tasks performed on the PSTN is stored in a searchable database, such as the searchable database 240 of FIG. 2. By storing PSTN maintenance information related to incidences in which physical plant is broken along with information related to the total number of maintenance tasks performed, a database user may be able to track whether the number of times that physical plant is broken is acceptable in view of the total number of maintenance tasks being performed or whether action needs to be taken to reduce the number of times that physical plant is broken by technicians in servicing the PSTN.

Figure 4:
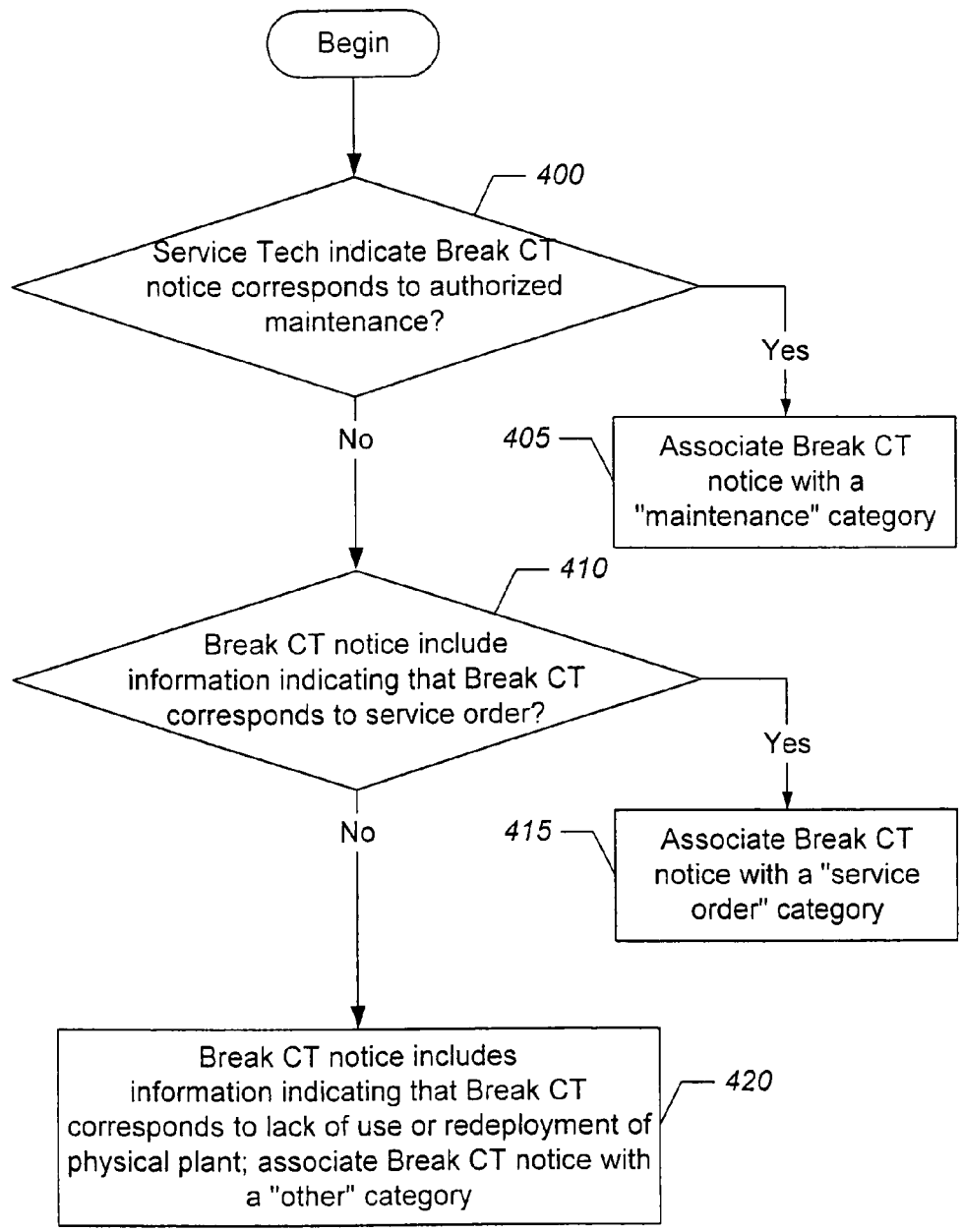

In accordance with some embodiments of the present invention, the information associated with the break CT notices, i.e., the maintenance tasks in which the physical plant in the PSTN is broken, may be categorized in the searchable database 240. Referring now to FIG. 4, operations begin at block 400 where the data processing system 130 of FIG. 1 determines if a service technician indicates that a break CT notice corresponds to authorized maintenance. If so, then the break CT notice or maintenance task information is associated with a "maintenance" category in the searchable database 240 at block 405. Otherwise, operations continue at block 410 where the data processing system 130 of FIG. 1 determines if the break CT notice includes information indicating that the break CT notice corresponds to a service order.

If so, then the break CT notice or maintenance task information is associated with a "service order" category in the searchable database 240 at block 415. Otherwise, operations continue at block 420 where the data processing system 130 of FIG. 1 concludes that the break CT notice includes information indicating that the break CT notice corresponds to lack of use and/or redeployment of physical plant. The break CT notice or maintenance task information is associated with a "other" category in the searchable database.

The flowcharts of FIGS. 3 and 4 illustrate the architecture, functionality, and operations of embodiments of the data processing system 130 in tracking breaks in physical plant that occur in maintaining a PSTN. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

As discussed above, the Web server module 235 may be configured to allow users to access the searchable database 240 through a Web browser running on a data processing system, such as, for example, the data processing system 140 of FIG. 1. FIGS. 5-16 illustrate exemplary user queries and Web page displays provided by the Web server module 235 in response to searchable database 240 queries/input submitted by a user.

Referring now to FIG. 5, the Web server module 235 provides a search page that is built on a hierarchical platform. To select a search criterion, selections are made for all fields above the search criterion in the hierarchy. For example, before listing break CTs associated with a particular district, a Network Vice President is selected first, in accordance with some embodiments of the invention, as shown in FIG. 6.

Figures 8, 9:
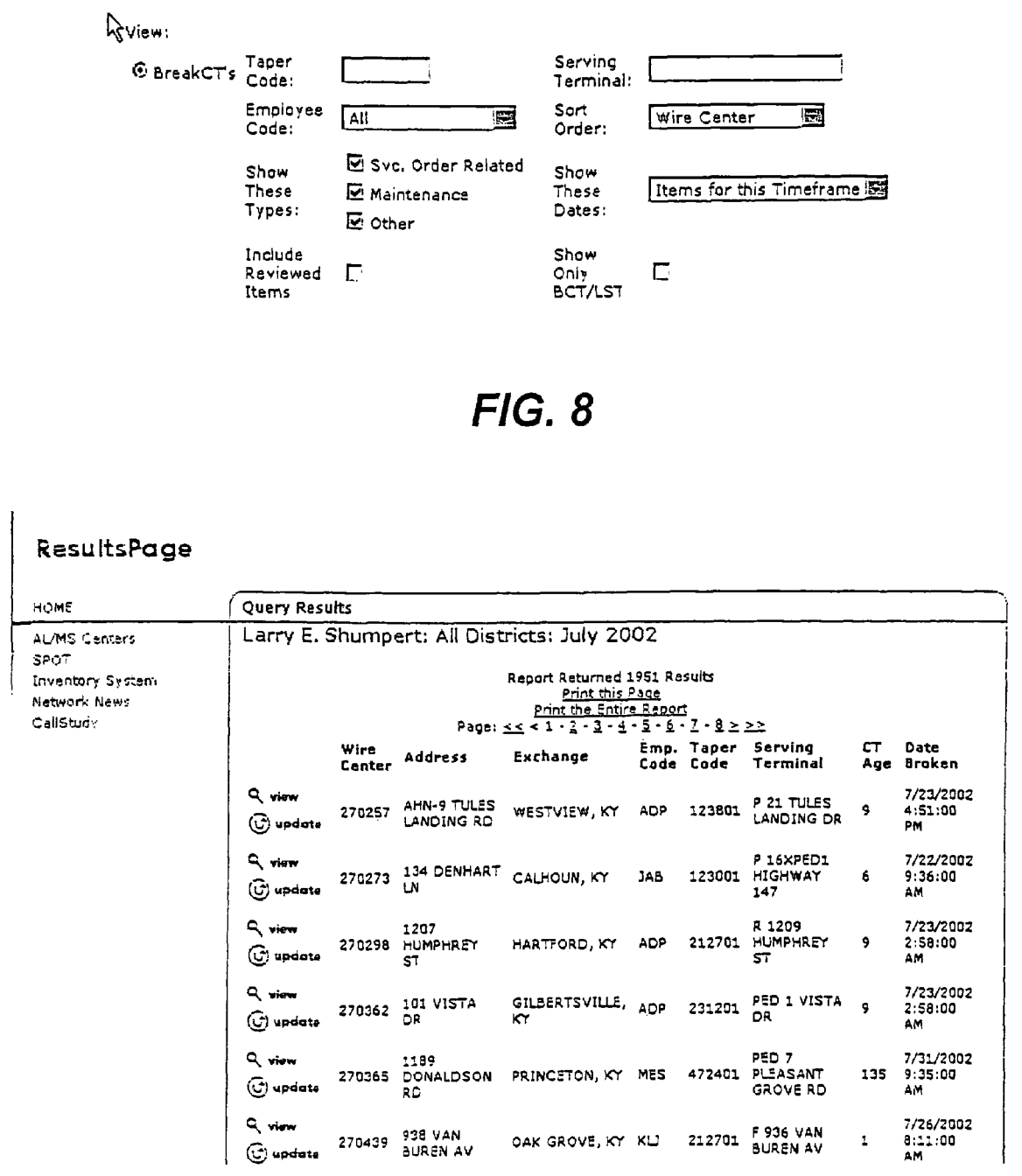

After selecting the Network Vice President, additional search criteria can be entered, such as district, turf, wire center, time interval, and category, e.g., service order, maintenance, or other as shown in FIGS. 7 and 8. FIG. 9 shows the results from a query of the searchable database 240 for a particular Network Vice President, in accordance with some embodiments of the present invention. A particular break CT notice may be viewed as shown in FIG. 10. In addition, a break CT notice may be updated with additional information.

Figure 11:

FIG. 11 illustrates a screen provided by the Web server module 235 for updating a break CT notice with additional information. After a user enters his or her name and identification, a dialog box is provided as shown in FIG. 12 in which the user can type additional information to be associated with a particular break CT notice.

FIG. 13 shows statistics obtained from the searchable database 240 related to the number of reinstallations that required a dispatch of a service technician to the address to perform maintenance on the physical plant organized according to Network Vice President. FIG. 14 shows similar statistics for a particular Network Vice President. A similar report may also be generated based on turf, wire centers in a turf, and/or a specific wire center. FIG. 15 shows the aforementioned statistics for a specific wire center.

FIG. 16 shows statistics provided from queries of the searchable database in which reinstall dispatches and break CT activity is organized by Network Vice President for a three month rolling window.

Many variations and modifications can be made to the preferred embodiments without substantially departing from the principles of the present invention. All such variations and modifications are intended to be included herein within the scope of the present invention, as set forth in the following claims.

That which is claimed:

1. A method of tracking modifications in maintaining a communication network, comprising:
   receiving notices corresponding to incidences in which physical plant is modified in performing maintenance tasks on the communication network and associated time information;
   receiving information specifying a total number of the maintenance tasks performed on the communication network during a defined time interval; and
   storing information associated with the maintenance tasks in which physical plant is modified and the total number of the maintenance tasks performed on the communication network in a searchable database.

2. The method of claim 1, wherein storing information comprises:
   parsing email notices corresponding to the information specifying the total number of the maintenance tasks performed on the communication network.

3. The method of claim 1, wherein storing information comprises:
   parsing print files corresponding to the notices corresponding to the incidences in which the physical plant is modified.

4. The method of claim 1, wherein storing information comprises:
   associating a first respective one of the maintenance tasks in which the physical plant is modified with a maintenance category based on information received from a service technician performing the first respective one of the maintenance tasks;
   associating a second respective one of the maintenance tasks in which the physical plant is modified with a service order category based on information contained in the notice received for the second respective one of the maintenance tasks authorizing the modification; and
   associating a third respective one of the maintenance tasks in which the physical plant is modified with an other category based on information contained in the notice received for the third respective one of the maintenance tasks authorizing the modification due to lack of use of the physical plant.

5. The method of claim 1, wherein storing information comprises:
   organizing the information in the searchable database based on geography, the method further comprising:
   receiving user input comprising a query of the searchable database based on geography; and
   displaying the information organized geographically responsive to the user input.

6. The method of claim 5, wherein organizing the information based on geography comprises:
   organizing the information in the searchable database based on state, district, turf, and wire center.

7. The method of claim 6, further comprising:
   receiving user input comprising a query of the searchable database based on the state, the district, the turf, and the wire center;
   displaying the information organized based on the state, the district, the turf, and the wire center responsive to the user input;
   organizing the information based on employee responsible for the district;

receiving user input comprising a query of the searchable database based on the employee responsible for the district; and displaying the information organized based on the employee responsible for the district responsive to the user input.

8. The method of claim 1, further comprising:

receiving user input comprising a request to update the information associated with a respective one of the maintenance tasks in which the physical plant is modified; and updating the information stored in the searchable database for the respective one of the maintenance tasks in which the physical plant is modified responsive to the user input.

9. The method of claim 1, wherein storing information comprises:

storing information in which the maintenance tasks in which the physical plant is modified is represented as a percentage of the total number of the maintenance tasks performed on the communication network in the searchable database.

10. The method of claim 1, further comprising:

receiving user input comprising a query of the information stored in the searchable database; and displaying the information associated with the query responsive to the user input.

11. A computer program product for tracking modifications in maintaining a communication network, comprising:

a non-transitory computer readable storage medium having computer readable program code embodied therein, the computer readable program code comprising:

computer readable program code configured to receive notices corresponding to incidences in which physical plant is modified in performing maintenance tasks on the communication network and associated time information;

computer readable program code configured to receive information specifying a total number of the maintenance tasks performed on the communication network during a defined time interval; and computer readable program code configured to store information associated with the maintenance tasks in which physical plant is modified and the total number of the maintenance tasks performed on the communication network in a searchable database.

12. The computer program product of claim 11, wherein the computer readable program code configured to store information comprises:

computer readable program code configured to parse email notices corresponding to the information specifying the total number of the maintenance tasks performed on the communication network.

13. The computer program product of claim 11, wherein the computer readable program code configured to store information comprises:

computer readable program code configured to parse print files corresponding to the notices corresponding to the incidences in which the physical plant is modified.

14. The computer program product of claim 11, wherein the computer readable program code configured to store information comprises:

computer readable program code configured to associate a first respective one of the maintenance tasks in which the physical plant is modified with a maintenance category based on information received from a service technician performing the first respective one of the maintenance tasks;

computer readable program code configured to associate a second respective one of the maintenance tasks in which the physical plant is modified with a service order category based on information contained in the notice received for the second respective one of the maintenance tasks authorizing the modification; and computer readable program code configured to associate a third respective one of the maintenance tasks in which the physical plant is modified with an other category based on information contained in the notice received for the respective one of the maintenance tasks authorizing the modification due to lack of use of the physical plant.

15. The computer program product of claim 11, wherein computer readable program code configured to store information comprises:

computer readable program code configured to organize the information in the searchable database based on geography, the computer program product further comprising:

computer readable program code configured to receive user input comprising a query of the searchable database based on geography; and computer readable program code configured to display the information organized geographically responsive to the user input.

16. The computer program product of claim 15, wherein the computer readable program code configured to organize the information based on geography comprises:

computer readable program code configured to organize the information in the searchable database based on state, district, turf, and wire center.

17. The computer program product of claim 16, further comprising:

computer readable program code configured to receive user input comprising a query of the searchable database based on the state, the district, the turf, and the wire center;

computer readable program code configured to display the information organized based on the state, the district, the turf, and the wire center responsive to the user input;

computer readable program code configured to organize the information based on employee responsible for the district;

computer readable program code configured to receive user input comprising a query of the searchable database based on the employee responsible for the district; and computer readable program code configured to display the information organized based on the employee responsible for the district responsive to the user input.

18. The computer program product of claim 11, further comprising:

computer readable program code configured to receive user input comprising a request to update the information associated with a respective one of the maintenance tasks in which the physical plant is modified; and computer readable program code configured to update the information stored in the searchable database for the respective one of the maintenance tasks in which the physical plant is modified responsive to the user input.

19. The computer program product of claim 11, wherein the computer readable program code configured to store information comprises:

computer readable program code configured to store information in which the maintenance tasks in which the physical plant is modified is represented as a percentage of the total number of the maintenance tasks performed on the communication network in the searchable database.

20. The computer program product of claim 11, further comprising:

computer readable program code configured to receive user input comprising a query of the information stored in the searchable database; and computer readable program code configured to display the information associated with the query responsive to the user input.

* * * * *